Patented Nov. 15, 1938

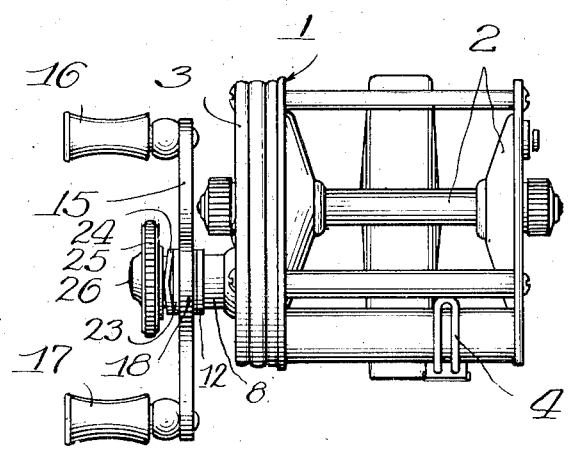
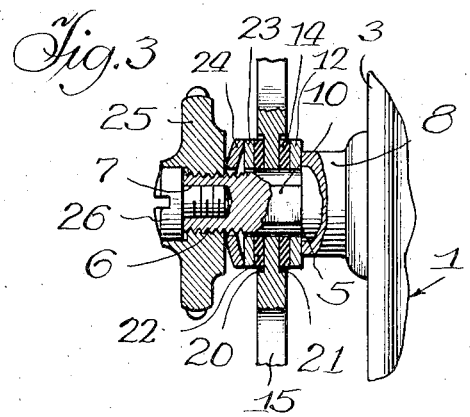
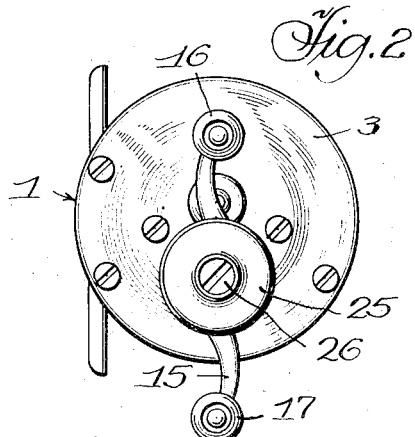
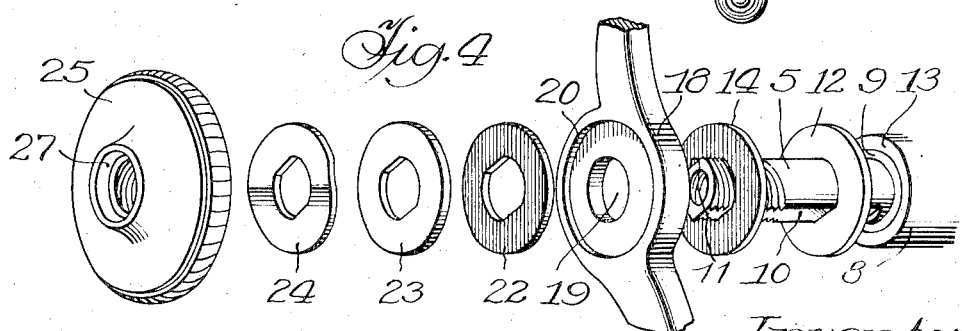

2,136,438

UNITED STATES PATENT OFFICE 2,136,438

ADJUSTABLE TENSION CLUTCH FOR FISHING REELS

Ole Horsrud, Chicago, Ill., assignor to Sears, Roebuck and Co., Chicago, Ill., a corporation of New York Application January 15, 1936, Serial No. 59,273

1 Claim. (Cl. 242—84.7)

This invention relates to an adjustable tension clutch for fishing reels and more particularly to such an arrangement of tension clutch as will prevent a fish from breaking the line.

As is well known, a fish of substantial size when hooked will fight vigorously to free itself, and oftentimes when being reeled in will jerk so hard as to break the line. The present invention eliminates this danger of breaking the line and enables the fisherman to continue the reeling in operation and at the same time permits the fish to go in the opposite direction and pull out the line during its struggling and without breaking the line.

Among the objects of this invention is to provide a tension clutch for fishing reels of such nature as to render it practically impossible for a fish when hooked and fighting under normal conditions to break the line.

A further object is to provide adjustability of the tension clutch so that a greater or less pull as desired may be required to cause the line to run out from the reel against the action of the reel.

A still further object is to provide an arrangement of parts that are economical to manufacture, possess great strength and durability, will not easily get out of order, and have maximum efficiency in operation.

This invention further resides in the combination, construction and arrangement of parts illustrated in the accompanying drawing, and while I have shown therein a preferred form I wish it understood that the same is susceptible of modification and change without departing from the spirit of my invention.

Other objects, advantages and capabilities will later more fully appear.

In the drawing:—

Fig. 1 is a plan view looking down on top of a fishing reel embodying the present invention.

Fig. 2 is an end elevation.

Fig. 3 is a fragmentary longitudinal sectional view through a portion of the reel, the section being taken through the tension clutch.

Fig. 4 is a perspective view showing the various parts of the adjustable tension clutch slightly spaced apart from each other but in their respective longitudinal positions with relation to each other just prior to being assembled in operative position.

Referring in detail to the drawing and more particularly Fig. 1, the adjustable tension clutch of the present invention is shown applied to a fishing reel comprising a frame 1 in which is rotatably mounted a line receiving drum 2. The frame at one end is provided with a gear casing 3 in which are mounted the usual gearing for providing the desired increase in speed of rotation from the handle to the line receiving drum (which gearing is not shown on the drawing). The reel is also provided with the usual leveling device 4, which forms no part of the present invention. Rotatably mounted in the gear casing 3 and having appropriate driving connection with the gears therein, is the drive shaft 5 which at its outer end is formed with the screw threads 6 and the threaded counterbore 7, for a purpose later more fully explained. This drive shaft 5 rotatably protrudes through the tubular extension 8, either formed integrally with the outer facing of the gear casing or rigidly fixed thereto as desired.

Flush with the outer face of the tubular extension 8 is a shoulder or offset 9, formed by making the drive shaft from this point to its outer end of slightly smaller diameter. As seen in Fig. 4, the outer extending end of drive shaft 5 is flattened on two opposite longitudinal faces at 10 and 11. A metal washer 12 provided with a non-circular opening as shown, in order to be longitudinally slidable on the drive shaft 5 but rotatable therewith, is first slipped over the drive shaft and into contact with shoulder 9 and the outer end face 13 of the tubular extension 8. Next there is slipped longitudinally over the drive shaft 5 a similarly shaped washer 14, which is made of fibre or the like.

The handle 15 is provided with the usual finger pieces 16, 17 and a hub 18, which is centrally formed with a circular opening 19, it being pointed out that this hub 18 because of this circular opening 19 is rotatable upon drive shaft 5. Hub 18 of handle 15 upon its two opposite faces is formed with a slight counterbore 20 and 21, the bottoms of said counterbores or recesses forming flat faced friction surfaces to frictionally engage the adjacent faces of the fibre washers 14 and 22. In assembling and assuming the disks 12 and 14 in place, the hub 18 is next slipped longitudinally over the drive shaft 5 with the finger pieces 16 and 17 pointing outwardly. In thus slipping the hub portion 18 over drive shaft 5 the counterbore 21 will have seated therein the fibre washer 14. Next the fibre washer 22, which also has a non-circular opening therein to cause it to rotate with the drive shaft, is slipped over the drive shaft and inserted into the counterbore 20 of hub 18. Next a metal washer 23 likewise having a non-circular opening for a similar purpose is slipped longitudinally over the drive shaft 5 into position against the fibre washer 22. Next a metal spring washer 24 likewise having a non-circular opening for a similar purpose and having a portion of its surface bent out of the plane of the washer for spring purposes, is slipped over the drive shaft 5 into contact with washer 23. The thumb nut or adjusting nut 25, which is formed with internal threads, is threaded on to the outer end of drive shaft 5 upon threads 6. Next the machine screw 26 is screwed into the threaded bore 7 in the outer end of the drive shaft, the inner face of this machine screw entering the counterbore 27 in the adjusting nut 25.

With the parts thus assembled it will be noted in Fig. 3 that the adjusting nut 25 has sufficient play that it can within certain limits be screwed backward or forward upon threads 6 for the purpose of tightening the adjacent faces of the fibre washers 14 and 22 with the inner faces of the counterbores 20 and 21 of hub 18. In other words, one face of each of these fibre washers has sliding contact with the adjacent hub surfaces 20 and 21 to provide friction therebetween, the amount of friction thus applied varying with the amount of tightening or loosening of adjusting nut 25. The spring washer 24 produces a certain amount of give or take due to its shape, as will be readily understood. Assuming the adjusting nut 25 to be rotated in a tightening direction to the desired degree, sufficient friction will be set up between the contacting faces of fibre washers 14 and 22 with the hub counterbore faces to cause the line receiving drum 2 to rotate upon rotation of handle 15 for the purpose of casting, reeling in or other usual operations of the ordinary fishing reel.

As is well known, when a fish is hooked it immediately begins to struggle and, as is also well known, it oftentimes happens in the use of ordinary reels that a large fish will give the line such a violent drag or pull as to break the line. With the present invention, however, this is rendered impossible for the reason that the adjustable tension clutch described herein will permit the line to be pulled outwardly and cause the drum 2 to rotate in an unwinding direction even though the handle is being rotated in a winding up direction, held stationary or being moved in an unwinding direction slower than is required for the drag or pull created by the fish. This, as will be understood is because of the slippage possible between the contacting faces of the fibre washers and the handle hub, which may be adjusted by the adjusting nut 25 for a greater or less friction as desired. In other words, this friction should be enough to enable reeling in the line by an appropriate rotation of the handle, but will permit slippage when the fish gives a greater pull in the opposite direction. The reel can accordingly be used for all ordinary purposes, with the added automatic feature of permitting the line to be pulled out of the drum 2 upon the application of a force in the unwinding direction sufficiently great to overcome the friction between the fibre washers and the handle hub. As stated above, the amount of this friction can be adjusted as desired by means of the adjusting nut 25.

While I have shown and described the spring tension washer 24 as being outside of the metal washer 23, it is to be understood that the same can be placed inside of this latter washer or at any other desired place in the arrangement of the washers as desired.

Having now described my invention, I claim:—

In a fishing reel having a driving shaft and a manually operatable handle directly mounted thereon by means of an opening therein through which said shaft extends, a slip clutch device operatively connected to said shaft and said handle and comprising friction elements each having a face adjacent the opposite sides of said handle and being so constructed and arranged as to rotate with said shaft but to move axially with respect to said shaft, said handle having a hub provided with recesses in its opposite side faces and around said shaft for receiving said friction elements, bottoms of said recesses forming friction surfaces for cooperation with the adjacent faces of said friction elements, tension means for varying the friction between said friction surfaces and said friction elements, and spaced abutments on said shaft with one of said abutments fixed to said shaft and another of said abutments axially adjustable with respect to said shaft, said adjustable abutment operating against said tension means.

OLE HORSRUD.